US009811566B1

(12) United States Patent
Kim et al.

(10) Patent No.: US 9,811,566 B1
(45) Date of Patent: *Nov. 7, 2017

(54) MODIFYING SEARCH RESULT RANKING BASED ON IMPLICIT USER FEEDBACK

(71) Applicant: Google Inc., Mountain View, CA (US)

(72) Inventors: Hyung-Jin Kim, Sunnyvale, CA (US); Simon Tong, Mountain View, CA (US); Noam M. Shazeer, Palo Alto, CA (US); Michelangelo Diligenti, Zurich (CH)

(73) Assignee: Google Inc., Mountain View, CA (US)

( * ) Notice: Subject to any disclaimer, the term of this patent is extended or adjusted under 35 U.S.C. 154(b) by 124 days.

This patent is subject to a terminal disclaimer.

(21) Appl. No.: 14/992,959

(22) Filed: Jan. 11, 2016

Related U.S. Application Data

(63) Continuation of application No. 14/143,622, filed on Dec. 30, 2013, now Pat. No. 9,235,627, which is a
(Continued)

(51) Int. Cl.
*G06F 17/30* (2006.01)
*G06F 7/00* (2006.01)

(52) U.S. Cl.
CPC .... *G06F 17/3053* (2013.01); *G06F 17/30867* (2013.01)

(58) Field of Classification Search
CPC .................. G06F 17/3053; G06F 17/30867
(Continued)

(56) References Cited

U.S. PATENT DOCUMENTS

| | | |
|---|---|---|
| 5,265,065 A | 11/1993 | Turtle |
| 5,488,725 A | 1/1996 | Turtle |

(Continued)

FOREIGN PATENT DOCUMENTS

| | | |
|---|---|---|
| WO | 00/77689 | 12/2000 |
| WO | 01/16807 | 3/2001 |

(Continued)

OTHER PUBLICATIONS

Soumen Chakrabarti, et al. "Enhanced Topic Distillation using Text, Markup tags, and Hyperlinks". ACM, Sep. 9-12, 2001, pp. 208-216.
(Continued)

*Primary Examiner* — Kuen Lu
(74) *Attorney, Agent, or Firm* — Fish & Richardson P.C.

(57) ABSTRACT

The present disclosure includes systems and techniques relating to ranking search results of a search query. In general, the subject matter described in this specification can be embodied in a computer-implemented method that includes determining a measure of relevance for a document result within a context of a search query for which the document result is returned, the determining being based on a first number in relation to a second number, the first number corresponding to longer views of the document result, and the second number corresponding to at least shorter views of the document result; and outputting the measure of relevance to a ranking engine for ranking of search results, including the document result, for a new search corresponding to the search query. The subject matter described in this specification can also be embodied in various corresponding computer program products, apparatus and systems.

20 Claims, 5 Drawing Sheets

Related U.S. Application Data continuation of application No. 11/556,143, filed on Nov. 2, 2006, now Pat. No. 8,661,029.

(58) Field of Classification Search
USPC .......................................................... 707/723
See application file for complete search history.

(56) References Cited

U.S. PATENT DOCUMENTS

| | | |
|---|---|---|
| 5,696,962 A | 12/1997 | Kupiec |
| 5,963,940 A | 10/1999 | Liddy et al. |
| 6,006,222 A | 12/1999 | Culliss |
| 6,006,225 A | 12/1999 | Bowman et al. |
| 6,014,665 A | 1/2000 | Culliss |
| 6,026,388 A | 2/2000 | Liddy et al. |
| 6,067,565 A | 5/2000 | Horvitz |
| 6,076,051 A | 6/2000 | Messerly et al. |
| 6,078,916 A | 6/2000 | Culliss |
| 6,078,917 A | 6/2000 | Paulsen et al. |
| 6,088,692 A | 7/2000 | Driscoll |
| 6,182,066 B1 | 1/2001 | Marques et al. |
| 6,182,068 B1 | 1/2001 | Culliss |
| 6,185,559 B1 | 2/2001 | Brin et al. |
| 6,249,252 B1 | 6/2001 | Dupray |
| 6,269,368 B1 | 7/2001 | Diamond |
| 6,285,999 B1 | 9/2001 | Page |
| 6,321,228 B1 | 11/2001 | Crandall et al. |
| 6,327,590 B1 | 12/2001 | Chidlovskii et al. |
| 6,334,132 B1 | 12/2001 | Weeks et al. |
| 6,341,283 B1 | 1/2002 | Yamakawa et al. |
| 6,353,849 B1 | 3/2002 | Linsk |
| 6,363,378 B1 | 3/2002 | Conklin et al. |
| 6,370,526 B1 | 4/2002 | Agrawal et al. |
| 6,421,675 B1 | 7/2002 | Ryan et al. |
| 6,473,752 B1 | 10/2002 | Fleming, III |
| 6,480,843 B2 | 11/2002 | Li |
| 6,490,575 B1 | 12/2002 | Berstis |
| 6,526,440 B1 | 2/2003 | Bharat |
| 6,529,903 B2 | 3/2003 | Smith et al. |
| 6,539,377 B1 | 3/2003 | Culliss |
| 6,560,590 B1 | 5/2003 | Shwe et al. |
| 6,567,103 B1 | 5/2003 | Chaudhry |
| 6,587,848 B1 | 7/2003 | Aggarwal et al. |
| 6,615,209 B1 | 9/2003 | Gomes |
| 6,623,529 B1 | 9/2003 | Lakritz |
| 6,640,218 B1 | 10/2003 | Golding et al. |
| 6,658,423 B1 | 12/2003 | Pugh et al. |
| 6,671,681 B1 | 12/2003 | Emens et al. |
| 6,678,681 B1 | 1/2004 | Brin et al. |
| 6,701,309 B1 | 3/2004 | Beeferman et al. |
| 6,725,259 B1 | 4/2004 | Bharat |
| 6,738,764 B2 | 5/2004 | Mao et al. |
| 6,754,873 B1 | 6/2004 | Law et al. |
| 6,792,416 B2 | 9/2004 | Soetarman et al. |
| 6,795,820 B2 | 9/2004 | Barnett |
| 6,816,850 B2 | 11/2004 | Culliss |
| 6,853,993 B2 | 2/2005 | Ortega et al. |
| 6,877,002 B2 | 4/2005 | Prince |
| 6,882,999 B2 | 4/2005 | Cohen et al. |
| 6,901,402 B1 | 5/2005 | Corston-Oliver et al. |
| 6,912,505 B2 | 6/2005 | Linden et al. |
| 6,944,611 B2 | 9/2005 | Flank et al. |
| 6,944,612 B2 | 9/2005 | Roustant et al. |
| 6,954,750 B2 | 10/2005 | Bradford |
| 6,963,867 B2 | 11/2005 | Ford et al. |
| 6,990,453 B2 | 1/2006 | Wang et al. |
| 7,016,939 B1 | 3/2006 | Rothwell et al. |
| 7,028,027 B1 | 4/2006 | Zha et al. |
| 7,072,886 B2 | 7/2006 | Salmenkaita et al. |
| 7,085,761 B2 | 8/2006 | Shibata |
| 7,113,939 B2 | 9/2006 | Chou et al. |
| 7,117,206 B1 | 10/2006 | Bharat et al. |
| 7,136,849 B2 | 11/2006 | Patrick |
| 7,146,361 B2 | 12/2006 | Broder et al. |
| 7,219,090 B2 * | 5/2007 | Travis, Jr. ......... G06F 17/30864 |
| 7,222,127 B1 | 5/2007 | Bem et al. |
| 7,231,399 B1 | 6/2007 | Bem et al. |
| 7,243,102 B1 | 7/2007 | Naam et al. |
| 7,249,126 B1 | 7/2007 | Ginsburg et al. |
| 7,266,765 B2 | 9/2007 | Golovchinsky et al. |
| 7,293,016 B1 | 11/2007 | Shakib et al. |
| 7,379,951 B2 | 5/2008 | Chkodrov et al. |
| 7,382,358 B2 | 6/2008 | Kushler et al. |
| 7,395,222 B1 | 7/2008 | Sotos |
| 7,426,507 B1 | 9/2008 | Patterson |
| 7,451,487 B2 | 11/2008 | Oliver et al. |
| 7,499,919 B2 | 3/2009 | Meyerzon et al. |
| 7,505,964 B2 | 3/2009 | Tong et al. |
| 7,516,146 B2 | 4/2009 | Robertson et al. |
| 7,526,470 B1 | 4/2009 | Karnawat et al. |
| 7,533,092 B2 | 5/2009 | Berkhin et al. |
| 7,533,130 B2 | 5/2009 | Narayana et al. |
| 7,552,112 B2 | 6/2009 | Jhala et al. |
| 7,565,363 B2 * | 7/2009 | Anwar ................. G06F 17/3053 |
| 7,565,367 B2 | 7/2009 | Barrett et al. |
| 7,566,363 B2 | 7/2009 | Starling et al. |
| 7,574,530 B2 | 8/2009 | Wang et al. |
| 7,584,181 B2 | 9/2009 | Zeng et al. |
| 7,603,350 B1 | 10/2009 | Guha |
| 7,610,282 B1 | 10/2009 | Datar et al. |
| 7,636,714 B1 | 12/2009 | Lamping et al. |
| 7,657,626 B1 | 2/2010 | Zwicky |
| 7,676,507 B2 | 3/2010 | Maim |
| 7,680,775 B2 | 3/2010 | Levin et al. |
| 7,693,818 B2 | 4/2010 | Majumder |
| 7,716,225 B1 | 5/2010 | Dean et al. |
| 7,747,612 B2 | 6/2010 | Thun et al. |
| 7,756,887 B1 | 7/2010 | Haveliwala |
| 7,769,740 B2 | 8/2010 | Martinez et al. |
| 7,783,632 B2 | 8/2010 | Richardson et al. |
| 7,792,833 B2 | 9/2010 | Meyerzon |
| 7,801,885 B1 | 9/2010 | Verma |
| 7,809,716 B2 | 10/2010 | Wang et al. |
| 7,818,315 B2 | 10/2010 | Cucerzan et al. |
| 7,818,320 B2 | 10/2010 | Makeev |
| 7,836,058 B2 | 11/2010 | Chellapilla |
| 7,844,589 B2 | 11/2010 | Wang et al. |
| 7,849,089 B2 | 12/2010 | Zhang et al. |
| 7,853,557 B2 | 12/2010 | Schneider et al. |
| 7,856,446 B2 | 12/2010 | Brave et al. |
| 7,860,886 B2 | 12/2010 | Loftesness |
| 7,877,404 B2 | 1/2011 | Achan et al. |
| 7,895,177 B2 | 2/2011 | Wu |
| 7,925,498 B1 | 4/2011 | Baker et al. |
| 7,925,649 B2 | 4/2011 | Jeh et al. |
| 7,953,740 B1 | 5/2011 | Vadon et al. |
| 7,974,974 B2 | 7/2011 | Tankovich et al. |
| 7,987,185 B1 | 7/2011 | Mysen et al. |
| 8,001,136 B1 | 8/2011 | Papachristou et al. |
| 8,019,650 B2 | 9/2011 | Donsbach et al. |
| 8,024,326 B2 | 9/2011 | Tong et al. |
| 8,024,330 B1 | 9/2011 | Franco et al. |
| 8,027,439 B2 | 9/2011 | Zoldi et al. |
| 8,037,042 B2 | 10/2011 | Anderson et al. |
| 8,037,043 B2 | 10/2011 | Zoeter et al. |
| 8,037,086 B1 | 10/2011 | Upstill et al. |
| 8,051,061 B2 | 11/2011 | Niu et al. |
| 8,060,456 B2 | 11/2011 | Gao et al. |
| 8,060,497 B1 | 11/2011 | Zatsman et al. |
| 8,065,296 B1 | 11/2011 | Franz et al. |
| 8,069,182 B2 | 11/2011 | Pieper |
| 8,073,263 B2 | 12/2011 | Hull et al. |
| 8,073,772 B2 | 12/2011 | Bishop et al. |
| 8,073,867 B2 | 12/2011 | Chowdhury |
| 8,082,242 B1 | 12/2011 | Mysen et al. |
| 8,086,599 B1 | 12/2011 | Heymans |
| 8,086,690 B1 | 12/2011 | Heymans |
| 8,090,717 B1 | 1/2012 | Bharat et al. |
| 8,126,839 B2 | 2/2012 | Chen et al. |
| 8,156,111 B2 | 4/2012 | Jones et al. |
| 8,171,041 B2 | 5/2012 | Bennett |
| 8,224,827 B2 | 7/2012 | Dean et al. |
| 8,239,370 B2 | 8/2012 | Wong et al. |
| 8,352,466 B2 | 1/2013 | Jones |

(56) References Cited

U.S. PATENT DOCUMENTS

| | | |
|---|---|---|
| 8,396,865 B1 | 3/2013 | Ie et al. |
| 8,407,229 B2 * | 3/2013 | Yang ................ G06F 17/30864 |
| | | 707/748 |
| 8,412,699 B1 | 4/2013 | Mukherjee et al. |
| 8,447,760 B1 | 5/2013 | Tong et al. |
| 8,458,165 B2 | 6/2013 | Liao et al. |
| 8,498,974 B1 | 7/2013 | Kim et al. |
| 8,521,725 B1 | 8/2013 | Pearson et al. |
| 8,583,636 B1 | 11/2013 | Franz et al. |
| 8,615,514 B1 | 12/2013 | Fernandes et al. |
| 8,661,012 B1 | 2/2014 | Baker et al. |
| 8,661,029 B1 | 2/2014 | Kim et al. |
| 8,694,374 B1 | 4/2014 | Diligenti et al. |
| 8,694,511 B1 | 4/2014 | Corduneanu et al. |
| 8,738,596 B1 | 5/2014 | Kim et al. |
| 8,832,083 B1 | 9/2014 | Chen et al. |
| 8,874,555 B1 | 10/2014 | Kim et al. |
| 8,898,150 B1 | 11/2014 | Kuramochi et al. |
| 8,898,152 B1 | 11/2014 | Ie et al. |
| 8,898,153 B1 | 11/2014 | Kim et al. |
| 8,909,655 B1 | 12/2014 | McDonnell |
| 8,924,379 B1 | 12/2014 | Kim et al. |
| 8,938,463 B1 | 1/2015 | Kim et al. |
| 9,002,867 B1 | 4/2015 | Adams et al. |
| 9,009,146 B1 | 4/2015 | Lopatenko et al. |
| 2001/0000356 A1 | 4/2001 | Woods |
| 2002/0034292 A1 | 3/2002 | Tuoriniemi et al. |
| 2002/0042791 A1 | 4/2002 | Smith et al. |
| 2002/0049752 A1 | 4/2002 | Bowman et al. |
| 2002/0103790 A1 | 8/2002 | Wang et al. |
| 2002/0123988 A1 | 9/2002 | Dean et al. |
| 2002/0133481 A1 | 9/2002 | Smith et al. |
| 2002/0165849 A1 | 11/2002 | Singh et al. |
| 2003/0009399 A1 | 1/2003 | Boerner |
| 2003/0018707 A1 | 1/2003 | Flocken |
| 2003/0028529 A1 | 2/2003 | Cheung et al. |
| 2003/0037074 A1 | 2/2003 | Dwork et al. |
| 2003/0078914 A1 | 4/2003 | Witbrock |
| 2003/0120654 A1 | 6/2003 | Edlund et al. |
| 2003/0135490 A1 | 7/2003 | Barrett et al. |
| 2003/0149704 A1 | 8/2003 | Yayoi et al. |
| 2003/0167252 A1 | 9/2003 | Odom et al. |
| 2003/0187837 A1 | 10/2003 | Culliss |
| 2003/0195877 A1 | 10/2003 | Ford et al. |
| 2003/0204495 A1 | 10/2003 | Lehnert |
| 2003/0220913 A1 | 11/2003 | Doganata et al. |
| 2003/0229640 A1 | 12/2003 | Carlson et al. |
| 2004/0006456 A1 | 1/2004 | Loofbourrow |
| 2004/0006740 A1 | 1/2004 | Krohn et al. |
| 2004/0034632 A1 | 2/2004 | Carmel et al. |
| 2004/0049486 A1 | 3/2004 | Scanlon et al. |
| 2004/0059708 A1 | 3/2004 | Dean et al. |
| 2004/0083205 A1 | 4/2004 | Yeager |
| 2004/0093325 A1 | 5/2004 | Banerjee et al. |
| 2004/0119740 A1 | 6/2004 | Chang et al. |
| 2004/0122811 A1 | 6/2004 | Page |
| 2004/0153472 A1 | 8/2004 | Rieffanaugh, Jr. |
| 2004/0158560 A1 | 8/2004 | Wen et al. |
| 2004/0186828 A1 | 9/2004 | Yadav |
| 2004/0186996 A1 | 9/2004 | Gibbs et al. |
| 2004/0199419 A1 | 10/2004 | Kim et al. |
| 2004/0215607 A1 | 10/2004 | Travis, Jr. |
| 2004/0243568 A1 * | 12/2004 | Wang ................ G06F 17/3043 |
| 2005/0015366 A1 | 1/2005 | Carrasco et al. |
| 2005/0021397 A1 | 1/2005 | Cui et al. |
| 2005/0027691 A1 | 2/2005 | Brin et al. |
| 2005/0033803 A1 | 2/2005 | Vleet et al. |
| 2005/0050014 A1 | 3/2005 | Gosse et al. |
| 2005/0050027 A1 | 3/2005 | Yeh |
| 2005/0055342 A1 | 3/2005 | Bharat et al. |
| 2005/0055345 A1 | 3/2005 | Ripley |
| 2005/0060290 A1 | 3/2005 | Herscovici et al. |
| 2005/0060310 A1 | 3/2005 | Tong et al. |
| 2005/0060311 A1 | 3/2005 | Tong et al. |
| 2005/0071741 A1 | 3/2005 | Acharya et al. |
| 2005/0102282 A1 | 5/2005 | Linden |
| 2005/0125376 A1 | 6/2005 | Curtis et al. |
| 2005/0160083 A1 | 7/2005 | Robinson |
| 2005/0192946 A1 | 9/2005 | Lu et al. |
| 2005/0198026 A1 | 9/2005 | Dehlinger et al. |
| 2005/0222987 A1 | 10/2005 | Vadon |
| 2005/0222998 A1 | 10/2005 | Driessen et al. |
| 2005/0240576 A1 | 10/2005 | Piscitello et al. |
| 2005/0240580 A1 | 10/2005 | Zamir et al. |
| 2005/0256848 A1 | 11/2005 | Alpert et al. |
| 2006/0036593 A1 | 2/2006 | Dean et al. |
| 2006/0047643 A1 | 3/2006 | Chaman |
| 2006/0069667 A1 | 3/2006 | Manasse et al. |
| 2006/0074903 A1 | 4/2006 | Meyerzon et al. |
| 2006/0089926 A1 | 4/2006 | Knepper et al. |
| 2006/0095421 A1 | 5/2006 | Nagai et al. |
| 2006/0106793 A1 * | 5/2006 | Liang ................ G06F 17/30654 |
| 2006/0123014 A1 | 6/2006 | Ng |
| 2006/0173830 A1 | 8/2006 | Smyth et al. |
| 2006/0195443 A1 | 8/2006 | Franklin et al. |
| 2006/0200476 A1 | 9/2006 | Gottumukkala et al. |
| 2006/0200556 A1 | 9/2006 | Brave et al. |
| 2006/0227992 A1 | 10/2006 | Rathus et al. |
| 2006/0230040 A1 | 10/2006 | Curtis et al. |
| 2006/0259476 A1 | 11/2006 | Kadayam et al. |
| 2006/0293950 A1 | 12/2006 | Meek et al. |
| 2006/0294060 A1 * | 12/2006 | Masuyama ....... G06F 17/30687 |
| 2007/0005575 A1 * | 1/2007 | Dai ................ G06F 17/30867 |
| 2007/0005588 A1 | 1/2007 | Zhang et al. |
| 2007/0016553 A1 | 1/2007 | Dumais |
| 2007/0038659 A1 | 2/2007 | Datar et al. |
| 2007/0050339 A1 | 3/2007 | Kasperski et al. |
| 2007/0061195 A1 | 3/2007 | Liu et al. |
| 2007/0061211 A1 | 3/2007 | Ramer et al. |
| 2007/0081197 A1 * | 4/2007 | Omoigui ........... G06F 17/30528 |
| | | 358/403 |
| 2007/0106659 A1 | 5/2007 | Lu et al. |
| 2007/0112730 A1 * | 5/2007 | Gulli ................ G06F 17/30864 |
| 2007/0118533 A1 * | 5/2007 | Ramer .............. G06F 17/30749 |
| 2007/0130370 A1 | 6/2007 | Akaezuwa |
| 2007/0156677 A1 | 7/2007 | Szabo |
| 2007/0172155 A1 | 7/2007 | Guckenberger |
| 2007/0180355 A1 | 8/2007 | McCall et al. |
| 2007/0192190 A1 | 8/2007 | Granville |
| 2007/0208730 A1 | 9/2007 | Agichtein et al. |
| 2007/0214044 A1 * | 9/2007 | Lee ..................... G06Q 30/02 |
| | | 705/14.54 |
| 2007/0214131 A1 * | 9/2007 | Cucerzan .......... G06F 17/30864 |
| 2007/0233653 A1 | 10/2007 | Biggs et al. |
| 2007/0233671 A1 | 10/2007 | Oztekin et al. |
| 2007/0255689 A1 | 11/2007 | Sun et al. |
| 2007/0260596 A1 | 11/2007 | Koran et al. |
| 2007/0260597 A1 | 11/2007 | Cramer et al. |
| 2007/0260624 A1 | 11/2007 | Chung |
| 2007/0266021 A1 | 11/2007 | Aravamudan et al. |
| 2007/0266439 A1 | 11/2007 | Kraft |
| 2007/0288450 A1 | 12/2007 | Datta et al. |
| 2008/0010143 A1 | 1/2008 | Kniaz et al. |
| 2008/0027913 A1 | 1/2008 | Chang et al. |
| 2008/0052219 A1 | 2/2008 | Sandholm et al. |
| 2008/0052273 A1 | 2/2008 | Pickens |
| 2008/0059453 A1 | 3/2008 | Laderman |
| 2008/0077570 A1 | 3/2008 | Tang et al. |
| 2008/0082518 A1 | 4/2008 | Loftesness |
| 2008/0091650 A1 * | 4/2008 | Fontoura ........... G06F 17/30867 |
| 2008/0104043 A1 | 5/2008 | Garg et al. |
| 2008/0114624 A1 | 5/2008 | Kitts |
| 2008/0114729 A1 | 5/2008 | Raman et al. |
| 2008/0114750 A1 | 5/2008 | Saxena et al. |
| 2008/0140699 A1 | 6/2008 | Jones et al. |
| 2008/0162475 A1 | 7/2008 | Meggs et al. |
| 2008/0183660 A1 | 7/2008 | Szulcewski |
| 2008/0189269 A1 | 8/2008 | Olsen |
| 2008/0208825 A1 | 8/2008 | Curtis et al. |
| 2008/0228442 A1 | 9/2008 | Lippincott et al. |
| 2008/0256050 A1 | 10/2008 | Zhang et al. |
| 2008/0313168 A1 | 12/2008 | Liu et al. |
| 2008/0313247 A1 | 12/2008 | Galvin |
| 2009/0006438 A1 | 1/2009 | Tunkelang et al. |

(56) References Cited

U.S. PATENT DOCUMENTS

| | | |
|---|---|---|
| 2009/0012969 A1 | 1/2009 | Rail et al. |
| 2009/0055392 A1 | 2/2009 | Gupta et al. |
| 2009/0070194 A1 | 3/2009 | Song |
| 2009/0089657 A1 | 4/2009 | Davis et al. |
| 2009/0094073 A1 | 4/2009 | Cheung et al. |
| 2009/0157643 A1 | 6/2009 | Gollapudi et al. |
| 2009/0171943 A1 | 7/2009 | Majumder et al. |
| 2009/0182723 A1 | 7/2009 | Shnitko et al. |
| 2009/0187557 A1 | 7/2009 | Hansen et al. |
| 2009/0228442 A1 | 9/2009 | Adams et al. |
| 2009/0287656 A1 | 11/2009 | Bennett |
| 2009/0313242 A1 | 12/2009 | Kodama |
| 2010/0106706 A1 | 4/2010 | Rorex et al. |
| 2010/0131563 A1 | 5/2010 | Yin |
| 2010/0161591 A1 | 6/2010 | Jones et al. |
| 2010/0205541 A1 | 8/2010 | Rapaport et al. |
| 2010/0228738 A1 | 9/2010 | Mehta et al. |
| 2010/0241472 A1 | 9/2010 | Hernandez |
| 2010/0299317 A1 | 11/2010 | Uy |
| 2010/0325131 A1 | 12/2010 | Dumais et al. |
| 2011/0029517 A1 | 2/2011 | Ji et al. |
| 2011/0087656 A1 | 4/2011 | Oh et al. |
| 2011/0087966 A1 | 4/2011 | Leviathan et al. |
| 2011/0179093 A1 | 7/2011 | Pike et al. |
| 2011/0219025 A1 | 9/2011 | Lipson et al. |
| 2011/0264670 A1 | 10/2011 | Banerjee et al. |
| 2011/0282906 A1 | 11/2011 | Wong |
| 2011/0295844 A1 | 12/2011 | Sun et al. |
| 2011/0295879 A1 | 12/2011 | Logis et al. |
| 2012/0011148 A1 | 1/2012 | Rathus et al. |
| 2012/0191705 A1 | 7/2012 | Tong et al. |

FOREIGN PATENT DOCUMENTS

| | | |
|---|---|---|
| WO | 01/67297 | 9/2001 |
| WO | 2004/059514 | 7/2004 |

OTHER PUBLICATIONS

Agichtein, et al; Improving Web Search Ranking by Incorporating User Behavior Information; Aug. 2006; Proceedings of the Twenty-Ninth Annual International ACM SIGIR Conference on Research and Development in Information Retrieval, p. 19-26.

Agichtein, et al; Learning User Interaction Models for Predicting Web Search Result Performances; Aug. 2006; Proceedings of the Twenty-Ninth Annual International ACM SIGIR Conference on Research and Development in Information Retrieval, p. 3-10.

Gabriel Somlo et al., "Using Web Hepler Agent Profiles in Query Generation", ACM, Jul. 2003, pp. 812-818.

Bar-Llan et al., "Presentation Bias is Significant in Determining User Preference for Search Results—A User Study"; Journal of the American Society for Information Science and Technology, vol. 60, Issue 1 (p. 135-149), Sep. 2008, 15 pages.

Bar-Llan et al.; ""Methods for comparing rankings of search engine results""; Computer Networks: The International Journal of Computer and Telecommunications Networking, Jul. 2006, vol. 50, Issue 10, 19 pages.

Boldi, et al.; The Query-flow Graph: Model and Applications; CKIM '08, Oct. 26-30, Napa Valley, California, USA, pp. 609-617.

Boyan et al.; A Machine Learning Architecture for Optimizing Web Search Engines; Aug. 1996; Internet-based information systems—Workshop Technical Report—American Association for Artificial Intelligence, p. 1-8.

Burke, Robin, Integrating Knowledge-based and Collaborative-filtering Recommender Systems, AAAI Technical Report WS-99-01. Compilation copyright © 1999, AAAI (www.aaai.org), pp. 69-72.

Craswell, et al.; Random Walks on the Click Graph; Jul. 2007; SIGIR '07, Amsterdam, the Netherlands, 8 pages.

Cutrell, et al.; Eye tracking in MSN Search: Investigating snippet length, target position and task types; 2007; Conference on Human Factors in Computing Systems—Proceedings of the SIGCHI Conference on Human Factors in Computing Systems.

Diligenti, et al., Users, Queries and Documents: A Unified Representation for Web Mining, wi-iat, vol. 1, 2009 IEEE/WIC/ACM International Joint Conference on Web Intelligence and Intelligent Agent Technology, 2009, pp. 238-244.

Google News archive, Jul. 8, 2003, Webmasterworld.com, [online] Retrieved from the Internet http://www.webmasterwolrd.com/forum3/15085.htm [retrieved on Nov. 20, 2009] 3 pages.

Grčar, Miha, User Profiling: Collaborative Filtering, SIKDD 2004, Oct. 12-15, 2004, Ljubljana, Slovenia, 4 pages.

Hofmann, Thomas, Latent Semantic Models for Collaborative Filtering, ACM Transactions on Information Systems, vol. 22, No. 1, Jan. 2004, pp. 89-115.

Joachims et al., "Search Engines that Learn from Implicit Feedback"; Aug. 2007, IEEE Computer Society.

Joachims, T., Evaluating retrieval performance using clickthrough data. Proceedings of the SIGIR Workshop on Mathematical/Formal Methods in Information Retrieval; Aug. 12-15, 2002; Tampere, Finland, 18 pages.

Joachims; Optimizing search engines using clickthrough data; 2002; Proceedings of the ACM SIGKDD International Conference on Knowledge Discovery and Data Mining, p. 133-142.

Kelly, et al.; Implicit Feedback for Inferring User Preference: A Bibliography; SIGIR Forum, vol. 37, No. 2 (2003), pp. 18-28.

Lemire, Daniel, Scale and Translation Invariant Collaborative Filtering Systems, Published in Information Retrieval, 8(1), pp. 129-150, 2005.

Linden, Greg et al., Amazon.com Recommendations: Item-to-Item Collaborative Filtering, [online], http://computer.org/internet/, IEEE Internet Computing, Jan.-Feb. 2003, IEEE Computer Society, pp. 76-80.

U.S. Patent Office, U.S. Appl. No. 11/556,143, filed Nov. 2, 2006, in Office Action dated Apr. 20, 2011, 18 pages.

U.S. Patent Office, U.S. Appl. No. 11/556,143, filed Nov. 2, 2006, in Office Action dated Jan. 25, 2010, 14 pages.

U.S. Patent Office, U.S. Appl. No. 11/556,143, filed Nov. 2, 2006, in Office Action dated Jul. 6, 2010, 20 pages.

U.S. Patent Office, U.S. Appl. No. 11/685,095, filed Mar. 12, 2007, in Office Action dated Apr. 13, 2011, 31 pages.

U.S. Patent Office, U.S. Appl. No. 11/685,095, filed Mar. 12, 2007, in Office Action dated Feb. 25, 2009, 21 pages.

U.S. Patent Office, U.S. Appl. No. 11/685,095, filed Mar. 12, 2007, in Office Action dated Feb. 8, 2010, 31 pages.

U.S. Patent Office, U.S. Appl. No. 11/685,095, filed Mar. 12, 2007, in Office Action dated Sep. 10, 2009, 23 pages.

Nicole, Kristen, Heeii is StumbleUpon Plus Google Suggestions, [online], Retrieved from the Internet http://mashable.com/2007/05/15/heeii/, 11 pages.

Radlinski, et al., Query Chains: Learning to Rank from Implicit Feedback, KDD '05, Aug. 21-24, 2005, Chicago, Illinois, USA, 10 pages.

U.S. Patent Office, U.S. Appl. No. 11/556,086, filed Nov. 2, 2006, in Office Action dated Jun. 23, 2010, 21 pages.

Schwab, et al., Adaptivity through Unobstrusive Learning, 2002, 16(3), pp. 5-9.

Stoilova, Lubomira et al., GiveALink: Mining a Semantic Network of Bookmarks for Web Search and Recommendation, LinkKDD '05, Aug. 21, 2005, Chicago, IL, USA, 8 pages.

W3C, URIs, URLs and URNs: Classification and Recommendations 1.0, Report from the joint W3C/IETF URI Planning Interest Group, Sep. 21, 2001, 8 pages.

Xiao, et al., Measuring Similarity of Interests for Clustering Web-Users, ADC, 2001, pp. 107-114.

Xie et al., Web User Clustering from Access Log Using Belief Function, K-CAP '01, Oct. 22-23, 2001, Victoria, British Columbia, Canada, pp. 202-208.

Yu et al., Selecting Relevant Instances for Efficient and Accurate Collaborative Filtering, CIKM '01, Nov. 5-10, 2001, Atlanta, Georgia, pp. 239-246.

Zeng et al., Similarity Measure and Instance Selection for Collaborative Filtering, WWW '03, May 20-24, 2003, Budapest, Hungary, pp. 652-658.

(56) References Cited

OTHER PUBLICATIONS

Zeng, et al., "Learning to Cluster Web Search Results", SIGIR '04, Proceedings of the 27th Annual International ACM SIGIR conference on research and development in information retrieval, 2004.
Australian Patent Office Non-Final Office Action in AU App. Ser. No. 2004275274, dated Feb. 3, 2010, 2 pages.
Dan Olsen et al., "Query-by-critique: Spoken Language Access to Large Lists", ACM, Oct. 2002, pp. 131-140.
Susan Gauch et al., "A Corpus Analysis Approach for Automatic Query Expansion and its Extension to Multiple Databases", ACM, Jul. 1999, pp. 250-269.
Nicolas Bruno et al., "Top-K Selection Queries over Relational Databases: Mapping Strategies and Performance Evaluation", ACM, Jun. 2002, pp. 153-187.
Ji-Rong Wen et al., "Query Clustering using User Logs", ACM, Jan. 2002, pp. 59-81.
Brin, S. and L. Page, The Anatomy of a Large-Scale Hypertextual Web Search Engine, Computer Science Department, Apr. 1998.
International Search Report and Written Opinion for Application No. PCT/US2004/029615, dated Jan. 19, 2005, 8 pages.
Hungarian Patent Office, International Search Report and Written Opinion for Application No. 200806756-3, dated Nov. 19, 2010 12 pages.
International Preliminary Report and Written Opinion for Application No. PCT/US2004/029615, dated Mar. 23, 2006.
Indian Office Action in Indian Application No. 686/KOLNP/2006, dated Jun. 3, 2008, 2 pages.
Danish Search Report and Written Opinion for Application No. 200601630-7, dated Jun. 21, 2007, 15 pages.
Jones et al., "Pictures of Relevance: A Geometric Analysis of Similarity Measures", Journal of the American Society for Information Science, Nov. 1987, 23 pages.
Kaplan et al., "Adaptive Hypertext Navigation Based on User Goals and Context", User Modeling and User-Adapted Interaction 2, Sep. 1, 1993; pp. 193-220, 28 pages.
Liddy et al., "A Natural Language Text Retrieval System With Relevance Feedback", 16th National Online, May 2-6, 1995, 3 pages.
Baeza-Yates, Ricardo, Carlos Hurtado, and Marcelo Mendoza. "Query recommendation using query logs in search engines." Current Trends in Database Technology—EDBT 2004 Workshops. Springer Berlin Heidelberg, 2005.
Velez, Bienvenido, et al. "Fast and effective query refinement." ACM SIGIR Forum. vol. 31. No. SI. ACM, 1997.
Mandala, Rila, Takenobu Tokunaga, and Hozumi Tanaka. "Combining multiple evidence from different types of thesaurus for query expansion." Proceedings of the 22nd annual international ACM SIGIR conference on Research and development in information retrieval. ACM, 1999.
"Personalizing Search via Automated Analysis of Interests and Activities," by Teevan et al. In: SIGIR'05 (2005), 8 pages.
Joachims, "Evaluating Search Engines Using Clickthrough Data", Cornell University, Department of Computer Science, Draft, Feb. 19, 2002, 13 pages.
Jansen et al., "An Analysis of Web Documents Retrieved and Viewed", School of Information Sciences and Technology, The Pennsylvania State University, the 4th International Conference on Internet Computing, Las Vegas, Nevada, pp. 65-69, Jun. 23-26, 2003, 5 pages.

\* cited by examiner

MODIFYING SEARCH RESULT RANKING BASED ON IMPLICIT USER FEEDBACK

CROSS-REFERENCE TO RELATED APPLICATIONS

This application is a continuation of, and claims priority to, pending U.S. application Ser. No. 14/143,622, filed Dec. 30, 2013, which in turn is a continuation of, and claims priority to, U.S. application Ser. No. 11/556,143, filed Nov. 2, 2006, and issued on Feb. 25, 2014, as U.S. Pat. No. 8,661,029. The entirety of each of the foregoing is incorporated by reference herein.

BACKGROUND

The present disclosure relates to ranking of search results.

Internet search engines aim to identify documents or other items that are relevant to a user's needs and to present the documents or items in a manner that is most useful to the user. Such activity often involves a fair amount of mind-reading—inferring from various clues what the user wants. Certain clues may be user specific. For example, knowledge that a user is making a request from a mobile device, and knowledge of the location of the device, can result in much better search results for such a user.

Clues about a user's needs may also be more general. For example, search results can have an elevated importance, or inferred relevance, if a number of other search results link to them. If the linking results are themselves highly relevant, then the linked-to results may have a particularly high relevance. Such an approach to determining relevance, generally associated with the GOOGLE® PageRank technology, is premised on the assumption that, if authors of web pages felt that another web site was relevant enough to be linked to, then web searchers would also find the site to be particularly relevant. In short, the web authors "vote up" the relevance of the sites.

Other various inputs may be used instead of, or in addition to, such techniques for determining and ranking search results. For example, user reactions to particular search results or search result lists may be gauged, so that results on which users often click will receive a higher ranking. The general assumption under such an approach is that searching users are often the best judges of relevance, so that if they select a particular search result, it is likely to be relevant, or at least more relevant than the presented alternatives.

SUMMARY

Systems, methods, and apparatus including computer program products for ranking search results of a search query are described. In general, particular inputs may be generated or analyzed to affect the presentation of search results. For example, such inputs may increase the relevance that a system will assign to a particular result in a particular situation, thus boosting the score or other indicator of relevance for the result (and perhaps the relevance of the result in the context of a particular query). Such an approach may benefit a user by providing them with search results that are more likely to match their needs. As a result, users can learn more using the internet, can find more relevant information more quickly, and will thus achieve more in their work or elsewhere, and will be more likely to use such a system again. A provider of such services may also benefit, by providing more useful services to users, and by thereby inducing more traffic to their search services. Such additional traffic may provide an operator with additional revenue, such as in the form of advertising that accompanies the searching and the delivery of search results.

One aspect of the subject matter described in this specification can be embodied in a computer-implemented method that includes determining a measure of relevance for a document result within a context of a search query for which the document result is returned, the determining being based on a first number in relation to a second number, the first number corresponding to longer views of the document result, and the second number corresponding to at least shorter views of the document result; and outputting the measure of relevance to a ranking engine for ranking of search results, including the document result, for a new search corresponding to the search query. The first number can include a number of the longer views of the document result, the second number can include a total number of views of the document result, and the determining can include dividing the number of longer views by the total number of views.

The method can further include tracking individual selections of the document result within the context of the search query for which the document result is returned; weighting document views resulting from the selections based on viewing length information to produce weighted views of the document result; and combining the weighted views of the document result to determine the first number. The second number can include a total number of views of the document result, the determining can include dividing the first number by the second number, and the measure of relevance can be independent of relevance for other document results returned in response to the search query.

The weighting can include applying a continuous function to the document views resulting from the selections. The weighting can include applying a discontinuous function to the document views resulting from the selections. Applying the discontinuous function can include classifying the individual selections of the document result into viewing time categories; and assigning weights to the individual selections based on results of the classifying.

The weighting can include weighting the document views based on the viewing length information in conjunction with a viewing length differentiator. The viewing length differentiator can include a factor governed by a determined category of the search query, and the weighting can include weighting the document views based on the determined category of the search query. The viewing length differentiator can include a factor governed by a determined type of a user generating the individual selections, and the weighting can include weighting the document views based on the determined type of the user.

The subject matter described in this specification can also be embodied in various corresponding computer program products, apparatus and systems. For example, a system can include a tracking component and a rank modifier engine structured to perform the operations described. Moreover, a system can include various means for performing the operations described, as detailed below, and equivalents thereof.

Particular embodiments of the described subject matter can be implemented to realize one or more of the following advantages. A ranking sub-system can include a rank modifier engine that uses implicit user feedback to cause re-ranking of search results in order to improve the final ranking presented to a user of an information retrieval system. User selections of search results (click data) can be tracked and transformed into a click fraction that can be used to re-rank future search results. Data can be collected on a per-query basis, and for a given query, user preferences for document results can be determined. Moreover, a measure of relevance (e.g., an LC|C click fraction) can be determined from implicit user feedback, where the measure of relevance can be independent of relevance for other document results returned in response to the search query, and the measure of relevance can reduce the effects of presentation bias (in the search results shown to a user), which might otherwise bleed into the implicit feedback.

The details of one or more implementations are set forth in the accompanying drawings and the description below. Other features, aspects, and advantages will become apparent from the description, the drawings, and the claims.

DESCRIPTION OF THE DRAWINGS

Like reference numbers and designations in the various drawings indicate like elements.

DETAILED DESCRIPTION

Figure 1:
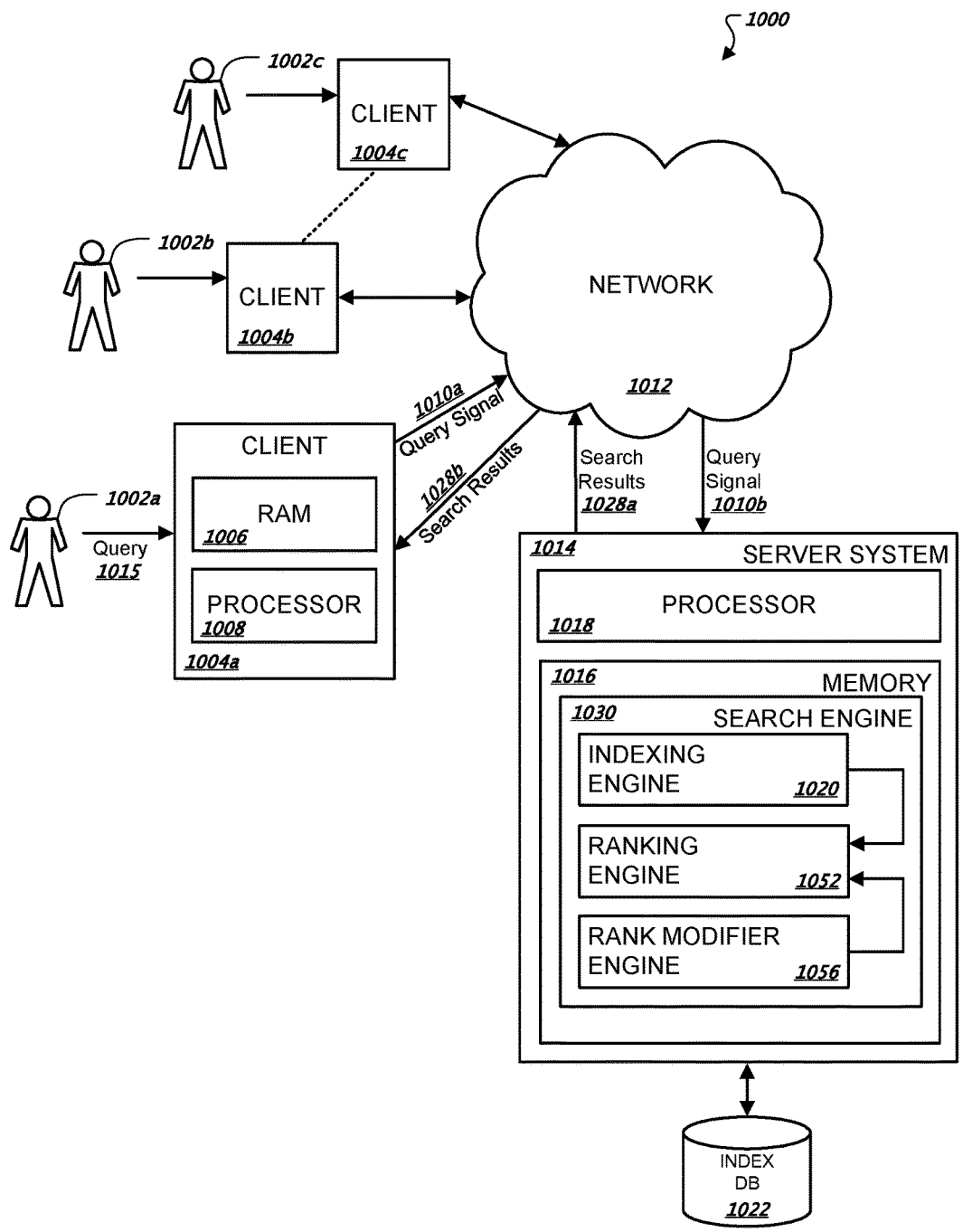
FIG. 1 shows an example information retrieval system in which the relevance of results obtained for submitted search queries can be improved.

FIG. 1 shows an example system 1000 for improving the relevance of results obtained from submitting search queries as can be implemented in an internet, intranet, or other client/server environment. The system 1000 is an example of an information retrieval system in which the systems, components and techniques described below can be implemented. Although several components are illustrated, there may be fewer or more components in the system 1000. Moreover, the components can be distributed on one or more computing devices connected by one or more networks or other suitable communication mediums.

A user 1002 (1002a, 1002b, 1002c) can interact with the system 1000 through a client device 1004 (1004a, 1004b, 1004c) or other device. For example, the client device 1004 can be a computer terminal within a local area network (LAN) or wide area network (WAN). The client device 1004 can include a random access memory (RAM) 1006 (or other memory and/or a storage device) and a processor 1008. The processor 1008 is structured to process instructions within the system 1000. In some implementations, the processor 1008 is a single-threaded processor. In other implementations, the processor 1008 is a multi-threaded processor. The processor 1008 can include multiple processing cores and is structured to process instructions stored in the RAM 1006 (or other memory and/or a storage device included with the client device 1004) to display graphical information for a user interface.

A user 1002a can connect to the search engine 1030 within a server system 1014 to submit a query 1015. When the user 1002a submits the query 1015 through an input device attached to a client device 1004a, a client-side query signal 1010a is sent into a network 1012 and is forwarded to the server system 1014 as a server-side query signal 1010b. Server system 1014 can be one or more server devices in one or more locations. A server device 1014 includes a memory device 1016, which can include the search engine 1030 loaded therein. A processor 1018 is structured to process instructions within the device 1014. These instructions can implement one or more components of the search engine 1030. The processor 1018 can be a single-threaded processor or a multi-threaded processor, and can include multiple processing cores. The processor 1018 can process instructions stored in the memory 1016 related to the search engine 1030 and can send information to the client device 1004, through the network 1012, to create a graphical presentation in a user interface of the client device 1004 (e.g., a search results web page displayed in a web browser).

The server-side query signal 1010b is received by the search engine 1030. The search engine 1030 uses the information within the user query 1015 (e.g. query terms) to find relevant documents. The search engine 1030 can include an indexing engine 1020 that actively searches a corpus (e.g., web pages on the Internet) to index the documents found in that corpus, and the index information for the documents in the corpus can be stored in an index database 1022. This index database 1022 can be accessed to identify documents related to the user query 1015. Note that, an electronic document (which for brevity will simply be referred to as a document) does not necessarily correspond to a file. A document can be stored in a portion of a file that holds other documents, in a single file dedicated to the document in question, or in multiple coordinated files.

The search engine 1030 can include a ranking engine 1052 to rank the documents related to the user query 1015. The ranking of the documents can be performed using traditional techniques for determining an information retrieval (IR) score for indexed documents in view of a given query. The relevance of a particular document with respect to a particular search term or to other provided information may be determined by any appropriate technique. For example, the general level of back-links to a document that contains matches for a search term may be used to infer a document's relevance. In particular, if a document is linked to (e.g., is the target of a hyperlink) by many other relevant documents (e.g., documents that also contain matches for the search terms), it can be inferred that the target document is particularly relevant. This inference can be made because the authors of the pointing documents presumably point, for the most part, to other documents that are relevant to their audience.

If the pointing documents are in turn the targets of links from other relevant documents, they can be considered more relevant, and the first document can be considered particularly relevant because it is the target of relevant (or even highly relevant) documents. Such a technique may be the determinant of a document's relevance or one of multiple determinants. The technique is exemplified in the GOOGLE® PageRank system, which treats a link from one web page to another as an indication of quality for the latter page, so that the page with the most such quality indicators wins. Appropriate techniques can also be taken to identify and eliminate attempts to cast false votes so as to artificially drive up the relevance of a page.

To further improve such traditional document ranking techniques, the ranking engine 1052 can receive an additional signal from a rank modifier engine 1056 to assist in determining an appropriate ranking for the documents. The rank modifier engine 1056 provides one or more measures of relevance for the documents, which can be used by the ranking engine 1052 to improve the search results' ranking provided to the user 1002. The rank modifier engine 1056 can perform one or more of the operations described further below to generate the one or more measures of relevance.

The search engine 1030 can forward the final, ranked result list within a server-side search results signal 1028a through the network 1012. Exiting the network 1012, a client-side search results signal 1028b can be received by the client device 1004a where the results can be stored within the RAM 1006 and/or used by the processor 1008 to display the results on an output device for the user 1002a.

Figure 2:
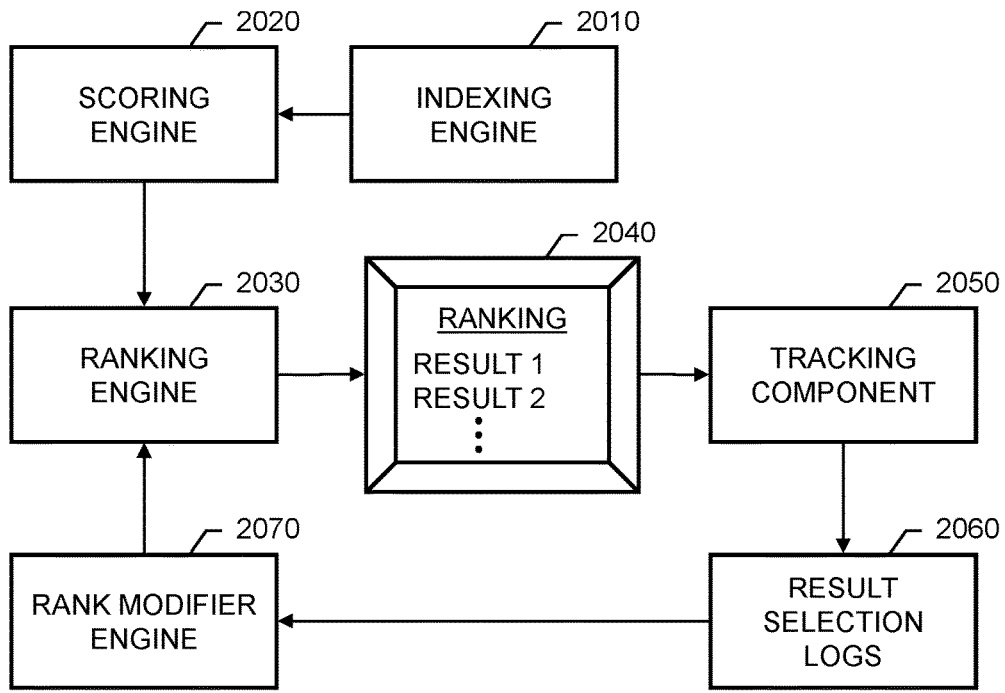
FIG. 2 shows example components of an information retrieval system.

FIG. 2 shows example components of an information retrieval system. These components can include an indexing engine 2010, a scoring engine 2020, a ranking engine 2030, and a rank modifier engine 2070. The indexing engine 2010 can function as described above for the indexing engine 1020. In addition, the scoring engine 2020 can generate scores for document results based on many different features, including content-based features that link a query to document results, and query-independent features that generally indicate the quality of documents results. The content-based features can include aspects of document format, such as query matches to title or anchor text in an HTML (Hyper Text Markup Language) page. The query-independent features can include aspects of document cross-referencing, such as the PageRank of the document or the domain. Moreover, the particular functions used by the scoring engine 2020 can be tuned, to adjust the various feature contributions to the final IR score, using automatic or semi-automatic processes.

The ranking engine 2030 can produce a ranking of document results 2040 for display to a user based on IR scores received from the scoring engine 2020 and one or more signals from the rank modifier engine 2070. A tracking component 2050 can be used to record information regarding individual user selections of the results presented in the ranking 2040. For example, the tracking component 2050 can be embedded JavaScript code included in a web page ranking 2040 that identifies user selections (clicks) of individual document results and also identifies when the user returns to the results page, thus indicating the amount of time the user spent viewing the selected document result. In other implementations, the tracking component 2050 can be proxy system through which user selections of the document results are routed, or the tracking component can include pre-installed software at the client (e.g., a toolbar plug-in to the client's operating system). Other implementations are also possible, such as by using a feature of a web browser that allows a tag/directive to be included in a page, which requests the browser to connect back to the server with message(s) regarding link(s) clicked by the user.

The recorded information can be stored in result selection logs 2060. The recorded information can include log entries that indicate, for each user selection, the query (Q), the document (D), the time (T) on the document, the language (L) employed by the user, and the country (C) where the user is likely located (e.g., based on the server used to access the IR system). Other information can also be recorded regarding user interactions with a presented ranking, including negative information, such as the fact that a document result was presented to a user, but was not clicked, position(s) of click(s) in the user interface, IR scores of clicked results, IR scores of all results shown before click, the titles and snippets shown to the user before the click, the user's cookie, cookie age, IP (Internet Protocol) address, user agent of the browser, etc. Moreover, similar information (e.g., IR scores, position, etc.) can be recorded for an entire session, or multiple sessions of a user, including potentially recording such information for every click that occurs both before and after a current click.

The information stored in the result selection logs 2060 can be used by the rank modifier engine 2070 in generating the one or more signals to the ranking engine 2030. In general, a wide range of information can be collected and used to modify or tune the click signal from the user to make the signal, and the future search results provided, a better fit for the user's needs. Thus, user interactions with the rankings presented to the users of the information retrieval system can be used to improve future rankings.

The components shown in FIG. 2 can be combined in various manners and implemented in various system configurations. For example, the scoring engine 2020 and the ranking engine 2030 can be merged into a single ranking engine, such as the ranking engine 1052 of FIG. 1. The rank modifier engine 2070 and the ranking engine 2030 can also be merged, and in general, a ranking engine includes any software component that generates a ranking of document results after a query. Moreover, a ranking engine can be included in a client system in addition to (or rather than) in a server system.

Figure 3:
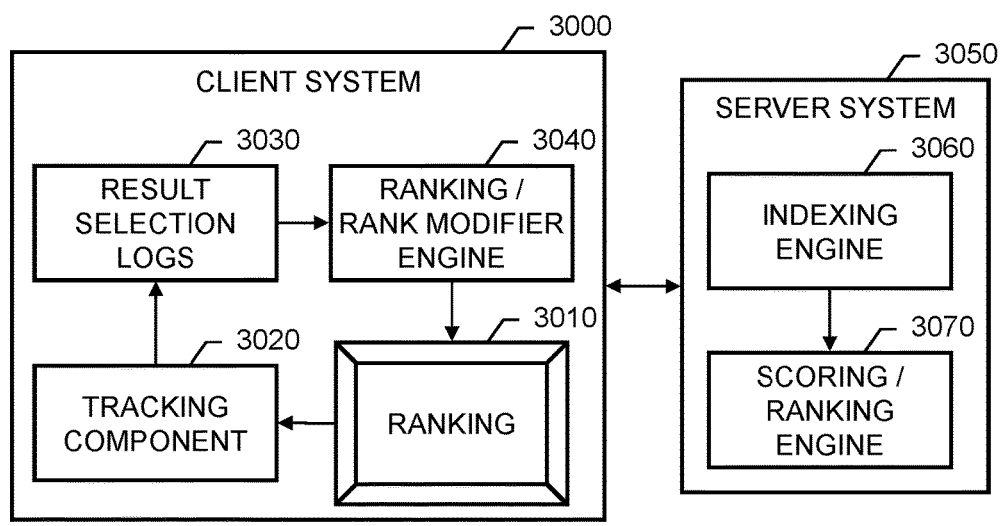
FIG. 3 shows another example information retrieval system.

FIG. 3 shows another example information retrieval system. In this system, a server system 3050 includes an indexing engine 3060 and a scoring/ranking engine 3070. A client system 3000 includes a user interface for presenting a ranking 3010, a tracking component 3020, result selection logs 3030 and a ranking/rank modifier engine 3040. For example, the client system 3000 can include a company's enterprise network and personal computers, in which a browser plug-in incorporates the ranking/rank modifier engine 3040. When an employee in the company initiates a search on the server system 3050, the scoring/ranking engine 3070 can return the search results along with either an initial ranking or the actual IR scores for the results. The browser plug-in can then re-rank the results locally based on tracked page selections for the company-specific user base.

Figure 4A:
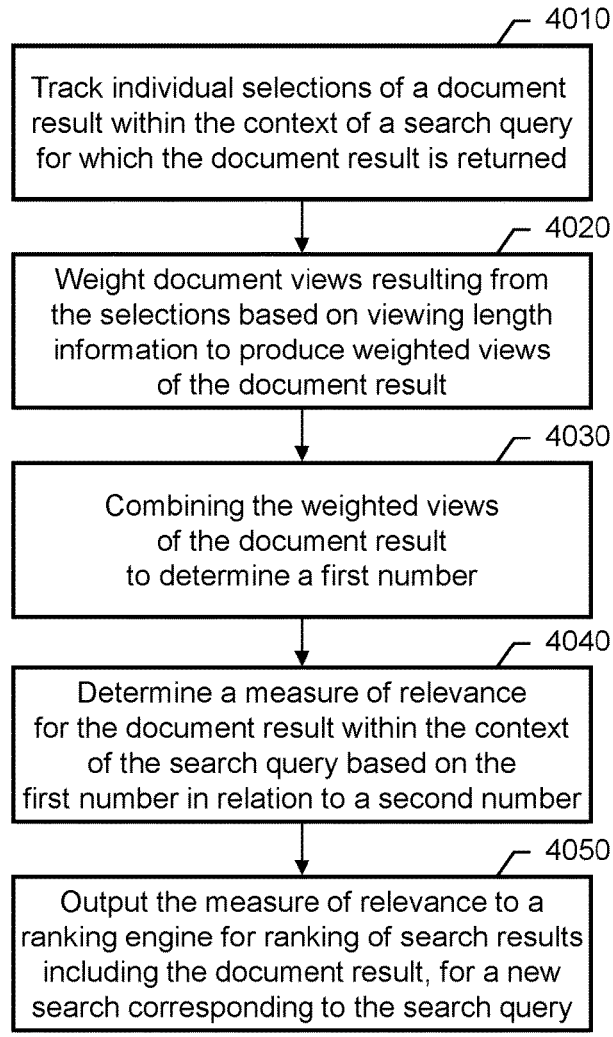
FIG. 4A shows an example process of generating a measure of relevance for a document for use in improving a search results' ranking.

FIG. 4A shows an example process of generating a measure of relevance for a document for use in improving a search results' ranking. Individual selections of a document result can be tracked 4010 within the context of a search query for which the document result is returned. For example, in the context of a web based information retrieval system, user's click data on web page search results can be gathered and stored in logs, which can be kept for all user queries. When a user clicks on a search result, the click can be tracked via JavaScript code embedded in the search results page, an embedded browser tag, etc. This code can track when and on what a user clicks in the main search results page, and can track when the user returns to that main page.

Post-click behavior can also be tracked via pre-installed software at the client (e.g., a toolbar plug-in to the client's operating system). Provided the user opts into fully sharing their browsing behavior, the toolbar software can track all the pages that the user visits, both before and after the search results page is delivered.

The information gathered for each click can include: (1) the query (Q) the user entered, (2) the document result (D) the user clicked on, (3) the time (T) on the document, (4) the interface language (L) (which can be given by the user), (5) the country (C) of the user (which can be identified by the host that they use, such as www-google-co-uk to indicate the United Kingdom), and (6) additional aspects of the user and session. The time (T) can be measured as the time between the initial click through to the document result until the time the user comes back to the main page and clicks on another document result. In general, an assessment is made about the time (T) regarding whether this time indicates a longer view of the document result or a shorter view of the document result, since longer views are generally indicative of quality for the clicked through result. This assessment about the time (T) can further be made in conjunction with various weighting techniques.

Document views resulting from the selections can be weighted 4020 based on viewing length information to produce weighted views of the document result. Thus, rather than simply distinguishing long clicks from short clicks, a wider range of click through viewing times can be included in the assessment of result quality, where longer viewing times in the range are given more weight than shorter viewing times. This weighting can be either continuous or discontinuous.

Figure 4B:
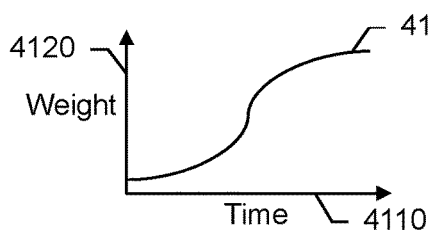
FIGS. 4B and 4C show example weighting functions.
Figure 4C:
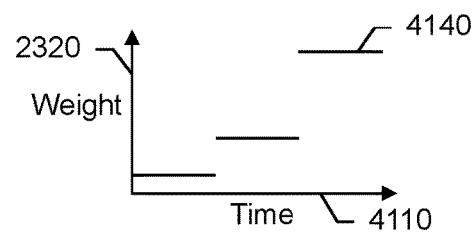

FIGS. 4B and 4C show example weighting functions, plotted against time 4110 and weight 4120. A continuous function 4130 can be applied to the document views resulting from the selections. Thus, the weight given to a particular click through time can fall within a continuous range of values, as defined by the function 4130. Alternatively, a discontinuous function 4140 can be applied to the document views resulting from the selections. As shown in the example of FIG. 4C, there are three viewing time categories, each having a corresponding weight. Note that the function 4140 can be an explicitly defined function, or merely implicit in the software implementation.

Figure 4D:
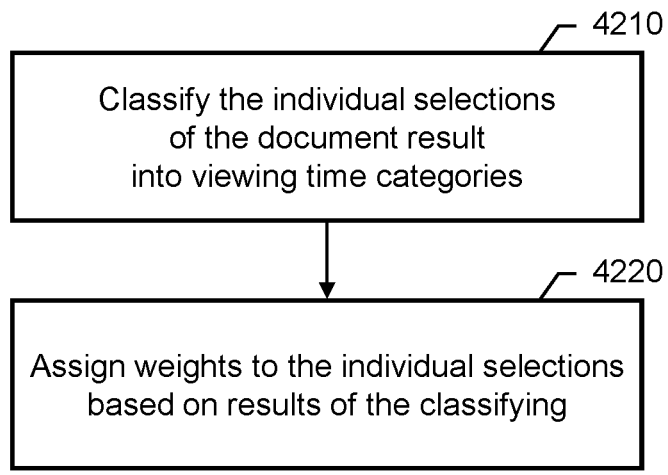
FIG. 4D shows an example process of discontinuous weighting.

FIG. 4D shows an example process of discontinuous weighting. The individual selections of the document result can be classified 4210 into viewing time categories, and weights can be assigned 4220 to the individual selections based on results of the classifying. For example, a short click can be considered indicative of a poor page and thus given a low weight (e.g., −0.1 per click), a medium click can be considered indicative of a potentially good page and thus given a slightly higher weight (e.g., 0.5 per click), a long click can be considered indicative of a good page and thus given a much higher weight (e.g., 1.0 per click), and a last click (where the user doesn't return to the main page) can be considered as likely indicative of a good page and thus given a fairly high weight (e.g., 0.9). Note that the click weighting can also be adjusted based on previous click information. For example, if another click preceded the last click, the last click can be considered as less indicative of a good page and given only a moderate weight (e.g., 0.3 per click).

The various time frames used to classify short, medium and long clicks, and the weights to apply, can be determined for a given search engine by comparing historical data from user selection logs with human generated explicit feedback on the quality of search results for various given queries, and the weighting process can be tuned accordingly. Furthermore, these time frames and weights can be adjusted based on one or more viewing length differentiators, as is described further below in connection with FIG. 4E.

The weighted views of the document result can be combined 4030 to determine a first number to be used in determining a measure of relevance. For example, the weighted clicks described above can be summed together for a given query-document pair. Note that safeguards against spammers (users who generate fraudulent clicks in an attempt to boost certain search results) can be taken to help ensure that the user selection data is meaningful, even when very little data is available for a given (rare) query. These safeguards can include employing a user model that describes how a user should behave over time, and if a user doesn't conform to this model, their click data can be disregarded. The safeguards can be designed to accomplish two main objectives: (1) ensure democracy in the votes (e.g., one single vote per cookie and/or IP for a given query-URL pair), and (2) entirely remove the information coming from cookies or IP addresses that do not look natural in their browsing behavior (e.g., abnormal distribution of click positions, click durations, clicks per minute/hour/day, etc.). Suspicious clicks can be removed, and the click signals for queries that appear to be spammed need not be used (e.g., queries for which the clicks feature a distribution of user agents, cookie ages, etc. that do not look normal).

A measure of relevance for the document result can be determined 4040 within the context of the search query for which the document result is returned. The determining can be based on a first number in relation to a second number, where the first number corresponds to longer views of the document result, and the second number corresponds to at least shorter views of the document result. The first number can be a number of the longer views of the document result, or the weighted selections, as described above, where the weights are skewed to longer views of the document result.

The second number includes at least the shorter views, such that a relation of long clicks to short clicks can be determined. This measure can help in reducing the effects of presentation bias, since an amount of time that users spend viewing a given document result is, in a sense, compared with itself. Presentation bias includes various aspects of presentation, such as an attractive title or snippet provided with the document result, and where the document result appears in the presented ranking (position). Note that users tend to click results with good snippets, or that are higher in the ranking, regardless of the real relevance of the document to the query as compared with the other results. By assessing the quality of a given document result for a given query, irrespective of the other document results for the given query, this measure of relevance can be relatively immune to presentation bias.

In addition to the shorter views, the second number can also include the longer views, and need not employ any weighting. For example, the second number can be the total number of views of the document result (an ordinal count of clicks on that result). The first number and second number can be combined to form a single feature for use in determining the measure of relevance for the document result within the context of the search query, and this measure of relevance can be independent of relevance for other document results returned in response to the search query.

Furthermore, this measure of relevance can be calculated as a fraction, which can be directly applied to IR scores of the search results, thereby boosting the documents in the resulting ranking that have implicit user feedback indicating document quality. This fraction is referred to as the LC|C click fraction since the fraction can be generally understood as the number of Long Clicks (which may be weighted clicks) divided by the number of Clicks overall for a given document result. A detailed description of an LC|C calculation follows, but it will be understood that variations on the following equations are also possible. A base LC|C click fraction can be defined as $$LCC\_BASE = [\#WC(Q,D)] / [\#C(Q,D) + S0]$$

where #WC(Q,D) is the sum of weighted clicks for a query-URL (Universal Resource Locator) pair, #C(Q,D) is the total number of clicks (ordinal count, not weighted) for the query-URL pair, and S0 is a smoothing factor.

The smoothing factor S0 can be chosen such that, if the number of samples for the query is low, then the click fraction will tend toward zero. If #C is much larger than S0, then the smoothing factor will not be a dominant factor. Thus, the smoothing factor can be added as a guard against noise in the click fraction.

The LCC_BASE click fraction considers only clicks for a given query-URL pair. At a high level, LC|C can be interpreted as a normalized measure of how long people stayed on a page given that they clicked through to that page, independent of other results for the query. Thus, the LC|C click fraction can be high for a given URL even if it gets far fewer clicks than a comparable result in a higher position.

In addition, the LC|C click fraction can be used on top of a traditional click fraction used previously. This traditional click fraction took into consideration the other results for the given query, and has been defined as follows:

$$T\_BASE=[\#WC(Q,D)]/[\#WC(Q)+S0]$$

where $\#WC(Q,D)$ is the sum of weighted clicks for a query-URL pair, $\#WC(Q)$ is the sum of weighted clicks for the query (summed over all results for the query), and S0 is a smoothing factor.

LC|C can also employ per-language and per-country fractions (with smoothing there between) similar to those employed with the traditional click fraction:

$$T\_LANG=[\#WC(Q,D,L)+S1 \cdot T\_BASE]/[\#WC(Q,L)+S1]$$

$$T\_COUNTRY=[\#WC(Q,D,L,C)+S2 \cdot T\_LANG]/[\#WC(Q,L,C)+S2]$$

where T_LANG incorporates language specific click data, plus T_BASE, and T_COUNTRY incorporates country (and language) specific click data, plus T_LANG. Thus, the LC|C click fractions can be calculated using:

$$LCC\_BASE=[\#WC(Q,D)]/[\#C(Q,D)+S0]$$

$$LCC\_LANG=[\#WC(Q,D,L)+S1 \cdot LCC\_BASE]/[\#C(Q,D,L)+S1]$$

$$LCC\_COUNTRY=[\#WC(Q,D,L,C)+S2 \cdot LCC\_LANG]/[\#C(Q,D,L,C)+S2]$$

In this manner, if there is less data for the more specific click fractions, the overall fraction falls back to the next higher level for which more data is available.

Alternatively, the LC|C click fraction can split the smoothing among click fractions apart from the smoothing used to determine the threshold at which the click fraction is considered to begin to provide useful information. Thus, the LC|C click fractions can be defined using a first set of smoothing parameters:

$$LCC\_BASE=[\#WC(Q,D)]/[\#C(Q,D)+S00]$$

$$LCC\_LANG=[\#WC(Q,D,L)]/[\#C(Q,D,L)+S10]$$

$$LCC\_COUNTRY=[\#WC(Q,D,L,C)]/[\#C(Q,D,L,C)+S20]$$

and the final LC|C click fraction can combine these separate click fractions using a second set of smoothing parameters:

$$LCC\_FINAL=X1 \cdot LCC\_COUNTRY+X2 \cdot LCC\_LANG+X3 \cdot LCC\_BASE$$

where $$X1=[\#WC(Q,L,C)]/[\#WC(Q,L,C)+S21]$$

$$X2=(1-X1) \cdot [\#WC(Q,L)]/[\#WC(Q,L)+S11]$$

$$X3=1-X1-X2$$

or $$X1=[\#C(Q,L,C)]/[\#C(Q,L,C)+S21]$$

$$X2=(1-X1) \cdot [\#C(Q,L)]/[\#C(Q,L)+S11]$$

$$X3=1-X1-X2$$

The first set of smoothing parameters can help in making the various LC|C click fractions comparable across documents. This can reduce the chances of a first document returned for a query having an LC|C click fraction that comes mainly from country/language specific data, while a second document returned for the same query has an LC|C click fraction that comes mainly from the base data.

Furthermore, it should be noted that different smoothing factors S0, S00, S1, S10, S11, S2, S20 and S21 can be used, or one or more of these can be the same smoothing factor. The smoothing factors used can be determined based on how much traffic is received within the context of the click fraction. For example, for a given country-language tuple, the smoothing factor can be raised concordant with the amount of traffic received (e.g., a larger smoothing factor can be used for US-English queries if a good deal more of such queries are received). In addition, the smoothing factor can be increased for query sources that have historically generated more spamming activity (e.g., queries from Russia).

The measure of relevance can be output 4050 to a ranking engine for ranking of search results, including the document result, for a new search corresponding to the search query. This measure of relevance (e.g., the LC|C click fraction described above) can be directly applied to IR scores for the documents, or this measure can be passed through a transform to create a boosting factor that can be applied to the IR scores. For example, the LC|C click fraction can be transformed into a boosting factor for the IR score according to the following equation:

$$IRBoost=1+M/(1+e^{\wedge}(X^*(LC|C-0.5)))$$

where M and X can be constants, such as:

$$(M,X)=(100,-100)$$

$$(M,X)=(50,-10)$$

$$(M,X)=(10,-5).$$

Employing a boosting function can help the LC|C click fractions to discriminate among, and correlate well with, the relevance of various documents.

Other transforms are also possible. For example, a linear form boosting function can be defined as:

$$IRBoost=1+\min(K,M^*(\max(0,LC|C-X)))$$

where K, M and X can be constants, such as:

$$(K,M,X)=(\text{infinity},100,0.5)$$

$$(K,M,X)=(49,100,0)$$

$$(K,M,X)=(9,20,0.1)$$

$$(K,M,X)=(\text{infinity},9,0).$$

Alternatively, an exponential form can be used as follows:

$$IRBoost=1+M \cdot (\max(X,LC|C-Y)^{(N)}$$

where M, X, Y and N can be constants, such as:

$$(M,X,Y,N)=(90,0.1,0,2.6)$$

$$(M,X,Y,N)=(15,0,0.2,2)$$

$$(M,X,Y,N)=(5,0,0,1.6)$$

$$(M,X,Y,N)=(0.5,0,-0.2,1.2)$$

$$(M,X,Y,N)=(90,0,-0.2,0.5).$$

Still further transforms are also possible. Such transforms can cause lower LC|C click fractions to generate almost no boost (e.g., a boost of about 1), whereas higher LC|C click fractions can generate a significant boost.

In any event, the transform employed can be adjusted based on the specific measure of relevance, and historical data combined with human generated relevance ratings (e.g., employed in a tuning process to select an appropriate boosting transform for a given implementation). Moreover, the measure of relevance can be used to modify and improve the ranking of search results generated for a given query, and the modified ranking can be presented to a user (e.g., on a display device in a web browser user interface).

Figure 4E:
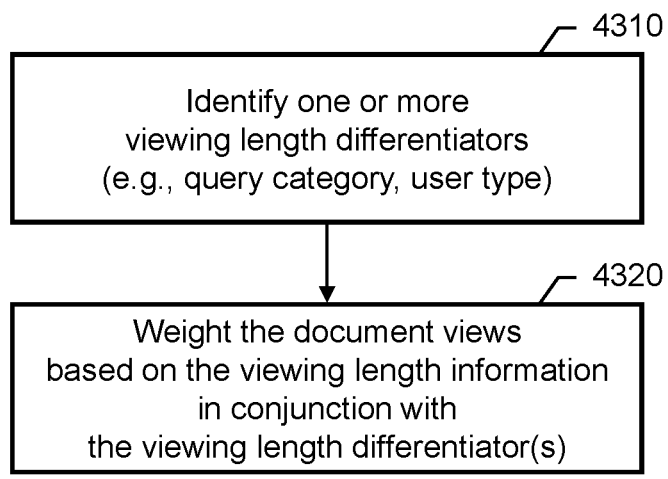
FIG. 4E shows an example process of weighting based on one or more viewing length differentiators.

As mentioned above, the weighting used can also be adjusted based on one or more viewing length differentiators. FIG. 4E shows an example process of such weighting. One or more viewing length differentiators (e.g., query category and user type) can be identified 4310 for use in the weighting. A viewing length differentiator can include a factor governed by a determined category of the search query, a factor governed by a determined type of a user generating the individual selections, or a combination of them. The document views can be weighted 4320 based on the viewing length information in conjunction with the viewing length differentiator(s), such as the determined category of the search query and the determined type of the user.

Thus, in the discontinuous weighting case (and the continuous weighting case), the threshold(s) (or formula) for what constitutes a good click can be evaluated on query and user specific bases. For example, the query categories can include "navigational" and "informational", where a navigational query is one for which a specific target page or site is likely desired (e.g., a query such as "BMW"), and an informational query is one for which many possible pages are equally useful (e.g., a query such as "George Washington's Birthday"). Note that such categories may also be broken down into sub-categories as well, such as informational-quick and informational-slow: a person may only need a small amount of time on a page to gather the information they seek when the query is "George Washington's Birthday", but that same user may need a good deal more time to assess a result when the query is "Hilbert transform tutorial".

The query categories can be identified by analyzing the IR scores or the historical implicit feedback provided by the click fractions. For example, significant skew in either of these (meaning only one or a few documents are highly favored over others) can indicate a query is navigational. In contrast, more dispersed click patterns for a query can indicate the query is informational. In general, a certain category of query can be identified (e.g., navigational), a set of such queries can be located and pulled from the historical click data, and a regression analysis can be performed to identify one or more features that are indicative of that query type (e.g., mean staytime for navigational queries versus other query categories; the term "staytime" refers to time spent viewing a document result, also known as document dwell time).

Traditional clustering techniques can also be used to identify the query categories. This can involve using generalized clustering algorithms to analyze historic queries based on features such as the broad nature of the query (e.g., informational or navigational), length of the query, and mean document staytime for the query. These types of features can be measured for historical queries, and the threshold(s) can be adjusted accordingly. For example, K means clustering can be performed on the average duration times for the observed queries, and the threshold(s) can be adjusted based on the resulting clusters.

User types can also be determined by analyzing click patterns. For example, computer savvy users often click faster than less experienced users, and thus users can be assigned different weighting functions based on their click behavior. These different weighting functions can even be fully user specific (a user group with one member). For example, the average click duration and/or click frequency for each individual user can be determined, and the threshold(s) for each individual user can be adjusted accordingly. Users can also be clustered into groups (e.g., using a K means clustering algorithm) based on various click behavior patterns.

Moreover, the weighting can be adjusted based on the determined type of the user both in terms of how click duration is translated into good clicks versus not-so-good clicks, and in terms of how much weight to give to the good clicks from a particular user group versus another user group. Some user's implicit feedback may be more valuable than other users due to the details of a user's review process. For example, a user that almost always clicks on the highest ranked result can have his good clicks assigned lower weights than a user who more often clicks results lower in the ranking first (since the second user is likely more discriminating in his assessment of what constitutes a good result). In addition, a user can be classified based on his or her query stream. Users that issue many queries on (or related to) a given topic T (e.g., queries related to law) can be presumed to have a high degree of expertise with respect to the given topic T, and their click data can be weighted accordingly for other queries by them on (or related to) the given topic T.

Figure 5:
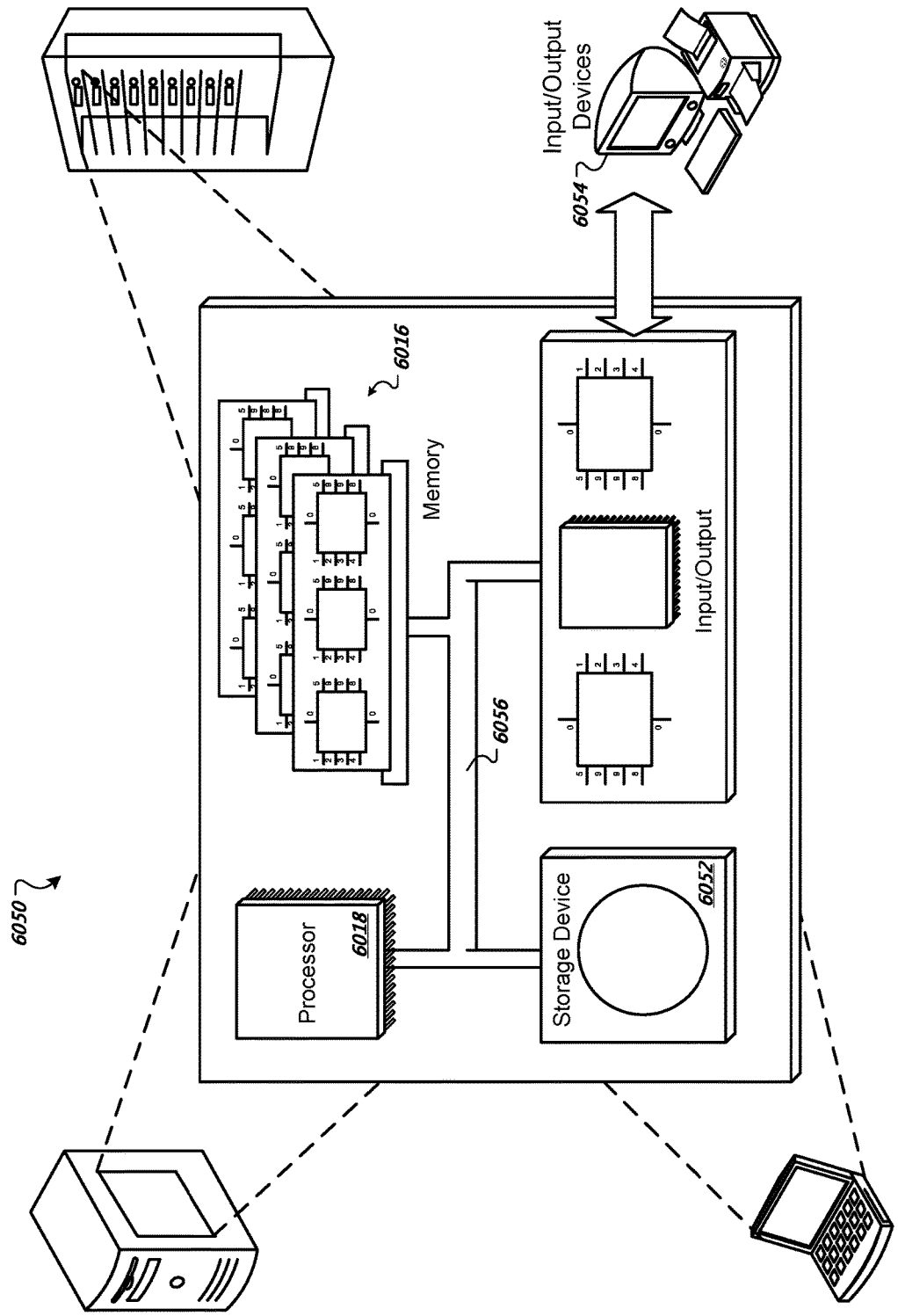
FIG. 5 is a schematic diagram of an example computer system.

FIG. 5 is a schematic diagram of an example computer system 6050. The system 6050 can be used for practicing operations described above. The system 6050 can include a processor 6018, a memory 6016, a storage device 6052, and input/output devices 6054. Each of the components 6018, 6016, 6052, and 6054 are interconnected using a system bus 6056. The processor 6018 is capable of processing instructions within the system 6050. These instructions can implement one or more aspects of the systems, components and techniques described above. In some implementations, the processor 6018 is a single-threaded processor. In other implementations, the processor 6018 is a multi-threaded processor. The processor 6018 can include multiple processing cores and is capable of processing instructions stored in the memory 6016 or on the storage device 6052 to display graphical information for a user interface on the input/output device 6054.

The memory 6016 is a computer readable medium such as volatile or non volatile that stores information within the system 6050. The memory 6016 can store processes related to the functionality of the search engine 1030, for example. The storage device 6052 is capable of providing persistent storage for the system 6050. The storage device 6052 can include a floppy disk device, a hard disk device, an optical disk device, or a tape device, or other suitable persistent storage mediums. The storage device 6052 can store the various databases described above. The input/output device 6054 provides input/output operations for the system 6050. The input/output device 6054 can include a keyboard, a pointing device, and a display unit for displaying graphical user interfaces.

The computer system shown in FIG. 5 is but one example. In general, embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. Moreover, the server environment, which is configured to provide electronic search service and employ the ranking systems and techniques described, need not be implemented using traditional back-end or middleware components. The server environment can be implemented using a program installed on a personal computing apparatus and used for electronic search of local files, or the server environment can be implemented using a search appliance (such as GOGGLE® in a Box, provided by Google Inc. of Mountain View, Calif.) installed in an enterprise network.

What is claimed is:

1. A system comprising:
a client system implemented on one or more computers for use by a plurality of users;
wherein the client system comprises:
   result selection logs stored on memory devices of the client system; and
   a tracking component that is operable to store in the result selection logs information about search result selections made by users of the client system;
wherein the client system is programmed with instructions that are operable, when executed on the client system, to cause the client system to perform operations to:
   submit a search query to a search engine that receives search queries from the client system and from other sources of queries;
   receive search results responsive to the search query, the search results including either an initial ranking of the search results from the search engine or actual information retrieval scores for the search results from the search engine;
   compute, for each of the search results, a respective measure of relevance based on the information stored by the tracking component of the client system about search result selections made by multiple users of the client system and not by other users of the search engine; and
   re-rank the search results returned by the search engine based on the respective measures of relevance and provide the re-ranked search results in a response to the search query.

2. The system of claim 1, wherein the client system is made up of computers of an enterprise and a data communication network of the enterprise.

3. The system of claim 2, wherein the computers of the enterprise include personal computers that have a web browser plug-in that incorporates instructions to re-rank locally the search results returned by the search engine.

4. The system of claim 2, wherein the tracking component is a proxy system through which user selections of search results are routed.

5. The system of claim 1, wherein:
the tracking component is operable to store click data on search results provided to users by the client system in the result selections logs stored on the client system.

6. The system of claim 5, wherein the tracking component is operable to store click data that comprises, for each user click made by any of the multiple users of the client system and not by other users of the search engine on a search result presented in response to a search query, (i) the search query corresponding to the user click, and (ii) data identifying the search result corresponding to the user click.

7. The system of claim 6, wherein the tracking component is further operable to store click data that comprises, for each user click made by any of the multiple users of the client system and not by other users of the search engine on a search result presented in response to a search query, (iii) data representing how much time a respective user spent on a corresponding document result.

8. The system of claim 6, wherein the tracking component is further operable to store click data that comprises, for each user click made by any of the multiple users of the client system and not by other users of the search engine on a search result presented in response to a search query, (iv) data representing where in a user interface the respective search result was presented.

9. The system of claim 6, wherein the tracking component is further operable to store click data that comprises, for each user click made by any of the multiple users of the client system and not by other users of the search engine on a search result presented in response to a search query, (v) information retrieval scores of all search results presented in a user interface before the search result corresponding to the user click is presented in the user interface.

10. The system of claim 6, wherein the tracking component is further operable to store click data that comprises, for each user click made by any of the multiple users of the client system and not by other users of the search engine on a search result presented in response to a search query, (vi) titles and snippets of search results presented in a user interface before the search result corresponding to the user click is presented in the user interface.

11. The system of claim 5, wherein the tracking component is operable to store click data that comprises information about user interactions with presentations of search results, including information identifying document results that were presented in the presentations but not clicked.

12. The system of claim 1, wherein the client system is implemented on a single computer.

13. A non-transitory computer-readable medium storing a computer program product that, when executed by a client system for use by a plurality of users, causes the client system to perform operations comprising:
storing in result selection logs of the client system, by a tracking component, information about search result selections made by multiple users of the client system;
submitting a search query to a search engine that receives search queries from the client system and from other sources of queries;
receiving search results responsive to the search query, the search results including either an initial ranking of the search results from the search engine or actual information retrieval scores for the search results from the search engine;

computing, for each of the search results received from the search engine, a respective measure of relevance based on the information stored by the tracking component of the client system about search result selections made by multiple users of the client system and not by other users of the search engine; and re-ranking the search results returned by the search engine based on the respective measure of relevance from the search result selections stored in the result selection logs of the client system and providing the re-ranked search results in response to the search query.

14. The non-transitory computer-readable medium of claim 13, wherein the operations comprise:

storing in the result selection logs of the client system, by the tracking component, for each user click made by any of the multiple users of the client system and not by other users of the search engine on a search result presented in response to a search query, (i) the search query corresponding to the user click, and (ii) data identifying the search result corresponding to the user click.

15. The non-transitory computer-readable medium of claim 14, wherein the operations comprise:

storing in the result selection logs of the client system, by the tracking component, for each user click made by any of the multiple users of the client system and not by other users of the search engine on a search result presented in response to a search query, (iii) data representing how much time a respective user spent on a corresponding document result.

16. The non-transitory computer-readable medium of claim 14, wherein the operations comprise:

storing in the result selection logs of the client system, by the tracking component, for each user click made by any of the multiple users of the client system and not by other users of the search engine on a search result presented in response to a search query, (iv) data representing where in a user interface the search result was presented.

17. The non-transitory computer-readable medium of claim 14, wherein the operations comprise:

storing in the result selection logs of the client system, by the tracking component, for each user click made by any of the multiple users of the client system and not by other users of the search engine on a search result presented in response to a search query, (v) information retrieval scores of all search results presented in a user interface before the search result corresponding to the user click is presented in the user interface.

18. The non-transitory computer-readable medium of claim 14, wherein the operations comprise:

storing in the result selection logs of the client system, by the tracking component, for each user click made by any of the multiple users of the client system and not by other users of the search engine on a search result presented in response to a search query, (vi) titles and snippets of search results presented in a user interface before the search result corresponding to the user click is presented in the user interface.

19. The non-transitory computer-readable medium of claim 13, wherein the operations comprise:

storing in the result selection logs of the client system, by the tracking component, click data that comprises information about user interactions with presentations of search results by any of the multiple users of the client system and not by other users of the search engine, including information identifying document results that were presented in the presentations but not clicked.

20. A computer-implemented method comprising:

storing, by a client system for use by a plurality of users, in result selection logs stored on memory devices of the client system by a tracking component of the client system, information about search result selections made by multiple users of the client system;

submitting, by the client system, a search query received to a search engine that receives search queries from the client system and from other sources of queries;

receiving, by the client system, search results responsive to the search query, the search results including either an initial ranking of the search results from the search engine or actual information retrieval scores for the search results from the search engine;

computing, by the client system, for each of the search results received from the search engine, a respective measure of relevance based on the information stored by the tracking component of the client system about search result selections made by multiple users of the client system and not by other users of the search engine; and re-ranking, by the client system, the search results returned by the search engine based on the respective measure of relevance from the search result selections stored in the result selection logs of the client system and providing the re-ranked search results in a response to the search query.

* * * * *